United States Patent [19]
Schiffler

[11] Patent Number: 5,735,540
[45] Date of Patent: Apr. 7, 1998

[54] DUAL-CIRCUIT HYDRAULIC SYSTEM FOR AN ACTIVE VEHICLE SUSPENSION CONTROL SYSTEM

[75] Inventor: Stefan Schiffler, Schonungen-Forst, Germany

[73] Assignee: Fichtel & Sachs AG, Schweinfurt, Germany

[21] Appl. No.: 627,611

[22] Filed: Apr. 4, 1996

[30] Foreign Application Priority Data

Apr. 8, 1995 [DE] Germany ............... 195 13 468.0

[51] Int. Cl.[6] ............... B60G 21/05; B60G 21/073
[52] U.S. Cl. ............... 280/689; 280/714; 267/188; 267/277
[58] Field of Search ............... 280/689, 772, 280/714, 709, 723; 267/187, 188, 191, 277

[56] References Cited

U.S. PATENT DOCUMENTS

| | | | |
|---|---|---|---|
| 4,834,419 | 5/1989 | Kozaki et al. | 280/689 |
| 5,362,094 | 11/1994 | Jensen | 280/689 |
| 5,529,324 | 6/1996 | Krawczyk et al. | 280/689 |
| 5,549,328 | 8/1996 | Cubalachini | 280/689 |

FOREIGN PATENT DOCUMENTS

| | | |
|---|---|---|
| 3705520 | 9/1988 | Germany. |
| 4326447 | 2/1995 | Germany. |
| 4337764 | 5/1995 | Germany. |

*Primary Examiner*—Peter C. English
*Attorney, Agent, or Firm*—Nils H. Ljungman and Associates

[57] ABSTRACT

A dual-circuit hydraulic system for an active vehicle suspension control system to eliminate a rolling movement of a motor vehicle by using an adjustable stabilizer on a motor vehicle front axle and an adjustable stabilizer on a motor vehicle rear axle. The dual-circuit hydraulic system has at least one supply pump which uses at least one shuttle valve to supply a pressure medium, by way of supply lines, to at least one dual action actuator on each stabilizer. Each dual action actuator has at least two working chambers. In emergency operation of the shuttle valve, the working chambers of the at least one actuator on the rear axle are unblocked, so that in the event of a rolling movement of the vehicle, the pressure medium is transferred by being pushed out of the working chambers of the rear axle actuator by the action of the rolling movement of the vehicle on the rear axle stabilizer.

20 Claims, 6 Drawing Sheets

DUAL-CIRCUIT HYDRAULIC SYSTEM FOR AN ACTIVE VEHICLE SUSPENSION CONTROL SYSTEM

BACKGROUND OF THE INVENTION

1. Field of the Invention

This invention relates to a dual-circuit hydraulic system for an active vehicle suspension control system to prevent a rolling movement of a motor vehicle by means of an adjustable stabilizer on a motor vehicle front axle and an adjustable stabilizer on a motor vehicle rear axle.

2. Background Information

German Laid Open Patent Application No. 37 05 520 discloses a dual-circuit hydraulic system which is designed to influence the rolling behavior of a motor vehicle. Basically, dual-circuit hydraulic systems have the advantage over single-circuit hydraulic systems that the actuator of the front axle can be actuated independently of the actuator of the rear axle, and naturally also vice-versa, so that it is possible to control the rolling behavior of each axle individually. It is thereby extremely important, in particular for vehicles which are adapted for the average driver, that the road behavior of the vehicle always tends toward understeer. This behavior can be achieved by making the stabilizer on the front axle always more effective than the stabilizer on the rear axle. But consideration must also be given to the behavior of the vehicle if the hydraulic system experiences a malfunction or damage. In known systems, the shuttle valves switch into the closed position, and thus the actuators are cut off from the supply pump. As a result of this undifferentiated control logic, there is no way to take into consideration the fact that, for example when there is an interruption of the connection between the shuttle valve and the actuator, the front axle stabilizer is ineffective and the rear axle stabilizer is still operating to its maximum effect, which results in a severe oversteer response of the vehicle.

OBJECT OF THE INVENTION

The object of the present invention is to realize a dual-circuit hydraulic system which essentially guarantees that in emergency operation, the stabilizer on the front axle will always be just as effective or more effective than the stabilizer on the rear axle.

SUMMARY OF THE INVENTION

The present invention teaches that this object can be accomplished by unblocking the working chambers of the at least one actuator on the rear axle in the event of the emergency operation of the shuttle valve, so that in the event of a rolling movement of the vehicle, the pressure medium can be transferred by being pumped out of the working chambers of the rear axle actuators by the rear axle stabilizer. The invention essentially ensures that the rear axle stabilizer cannot be more effective than the front axle stabilizer. The desired somewhat understeered road response of the vehicle is essentially always maintained.

That is, during emergency operation, rather than the actuator opposing the forces transmitted to the actuator by the stabilizer and holding the rear stabilizer in an effective, functioning position, the force transmitted by the rear stabilizer to the at least one rear actuator will push or pump the hydraulic fluid out of the working chambers of the at least one rear axle actuator, so that the rear stabilizer cannot be more effective than the front stabilizer.

To keep the number of valves low, an 8/3-way valve is used as the shuttle valve to feed both actuators of the vehicle axles. The lower the number of valves, the lower the possibility of malfunctioning valves.

In one embodiment, in the emergency operating position, the shuttle valve connects the working chambers which have the same connection orientation on both vehicle axles. In other words, the work chambers which effect a raising of the body are connected to one another, and the work chambers which effect a lowering of the body are also connected to one another. More specifically, the working chamber of the front axle actuator which raises the body is connected to the working chamber of the rear axle actuator which raises the body; and similarly the working chamber of the front axle actuator which lowers the body is connected to the working chamber of the rear axle actuator which lowers the body. Therefore the rear stabilizer, at a maximum, can only be as effective as the front stabilizer, since an equalization is accomplished by means of the hydraulic connection. In addition, the supply lines of the front axle can each have a pressure sensor between the shuttle valve and the actuator, which pressure sensors are used to check the supply lines for leaks. The pressure sensors also make it possible to detect malfunctions, e.g. the rupture of a supply line. If no pressure is measured at the pressure sensor, it must be assumed that the supply line is defective. In the case when no pressure is measured in the supply line, the shuttle valve switches into the emergency operating position which cuts off the supply of pressure to the actuator on the rear axle. In the emergency operating position, each work chamber of the front actuator is connected to the corresponding work chamber of the rear actuator, so if there is a leak in the supply lines of the front actuator, the rear actuator can only pump the fluid via the shuttle valve and can also run empty. In any case, it is essentially guaranteed that the rear stabilizer will not be more effective than the front stabilizer.

Alternatively, when the shuttle valve is in the emergency operating position, the shuttle valve can block the working chambers of the actuator on the front axle and connect the working chambers of the actuator on the rear axle to one another. In addition, to be able to detect any leaks which may be present in the supply to the actuator on the front axle, there is an emergency operation shuttle valve (the emergency operation shuttle valve is a second shuttle valve in addition to the regular shuttle valve discussed above), which emergency operation shuttle valve is located between the shuttle valve and the actuator on the rear axle and is actuated by means of a control line system which is fed from supply lines between the shuttle valve and the actuator on the front axle, so that in the emergency operating position of the shuttle valve, and when the pressure conditions in the supply lines to the front actuator are intact, the emergency operation shuttle valve is switched into the closed position. The advantage of this measure is that when there is a failure in the supply of hydraulic power, the blocking moves the front stabilizer into the most effective position. The pressure in the supply lines between the shuttle valve and the actuator on the front axle is an indicator of whether these supply lines are defective. If the supply lines were defective, there could be no pressure in the supply lines. Consequently, there would also be no control pressure in the control line system, so that the emergency operation shuttle valve would be switched to open. The rear actuator can transfer the hydraulic fluid by pumping it via the shuttle valve, so that no action of the rear stabilizer would be noticeable. When there is pressure in the supply lines, the control line system is also under pressure, which essentially guarantees that the emergency operating shuttle valve will be switched into the closed position. Then both stabilizers are effective to their maximum extent, but once again the rear stabilizer cannot have an effect which is greater than that of the front stabilizer, because as a rule the stabilizer, which is in the form of a torsion element on the front axle, is realized so that it is more powerful than the stabilizer on the rear axle.

In other words, alternatively, when the shuttle valve is in the emergency operating position, the shuttle valve can be designed to block the working chambers of the actuator on the front axle and at the same time connect one of the working chambers of the actuator on the rear axle to the opposing working chamber of the actuator on the rear axle. Thus, by blocking the front actuator the front stabilizer is effective. To make the rear axle actuator effective also, there is an emergency operation shuttle valve (the emergency operation shuttle valve is a second shuttle valve in addition to the regular shuttle valve), which emergency operation shuttle valve is located between the regular shuttle valve and the actuator on the rear axle. When the emergency operation shuttle valve is actuated, the emergency operation shuttle valve is closed so that the hydraulic supply lines to the rear axle actuator are blocked, thereby making the rear axle actuator effective. The emergency operation shuttle valve is activated by means of a control line system which is fed from the hydraulic supply lines which run between the regular shuttle valve and the actuator on the front axle, so that in the emergency position of the regular shuttle valve, and when the pressure conditions in the supply lines to the front actuator are intact, the emergency operation shuttle valve is switched into the closed position. The advantage of this measure is that when there is a failure in the operation of the system so that the regular shuttle valve is in the emergency position, both the supply lines to the front actuator and the supply lines to the rear actuator can be blocked, to make both the front stabilizer and the rear stabilizer effective. If the supply lines between the regular shuttle valve and the actuator on the front axle were to be defective or damaged, the pressure in these supply lines could drop. Consequently, there would also be no control pressure in the control line system of the emergency operation shuttle valve, so that the emergency operation shuttle valve would be switched to open. With the emergency operation shuttle valve switched to open, the rear actuator can transfer the hydraulic fluid between opposing work chambers by pumping the fluid via the regular shuttle valve, so that no action of the rear stabilizer would be noticeable. When there is pressure in the supply lines, the control line system is also under pressure, which essentially guarantees that the emergency operating shuttle valve will be switched into the closed position. With the regular shuttle valve in the emergency position, and the emergency operation shuttle valve in the closed position, both stabilizers are effective to their maximum extent, but once again the rear stabilizer cannot have an effect which is greater than that of the front stabilizer, because as a rule the stabilizer on the front axle, which stabilizer is in the form of a torsion element, is realized so that it is more powerful than the stabilizer on the rear axle. For example, the arm portion of the torsion bar on the front axle can be longer than the arm portion of the torsion bar on the rear axle.

One feature of the invention resides broadly in an active vehicle suspension control system with a dual-circuit pressure medium actuation system to eliminate a rolling movement of a vehicle, the active vehicle control system comprising: a front axle stabilizing arrangement; at least one actuator connecting to the front stabilizing arrangement; the at least one front actuator comprising a first pressure chamber element and a second pressure chamber element; the dual-circuit pressure medium actuation system comprising a first pressure medium circuit; the first pressure medium circuit comprising: an element for pressurizing the first chamber element of the front actuator for providing movement of the front actuator in a first direction; an element for pressurizing the second chamber element of the front actuator for providing movement of the front actuator in a second direction; and the front actuator second direction being opposite to the front actuator first direction; a rear axle stabilizing arrangement; at least one actuator connecting to the rear stabilizing arrangement; the at least one rear actuator comprising a first pressure chamber element and a second pressure chamber element; the dual-circuit pressure medium actuation system comprising a second pressure medium circuit; the second pressure medium circuit comprising: an element for pressurizing the first chamber element of the rear actuator for providing movement of the rear actuator in a first direction; an element for pressurizing the second chamber element of the rear actuator for providing movement of the rear actuator in a second direction; and the rear actuator second direction being opposite to the rear actuator first direction; the first pressure medium circuit comprising a first valve element for solely controlling pressure medium flow in the first pressure medium circuit; the second pressure medium circuit comprising a second valve element for solely controlling pressure medium flow in the second pressure medium circuit; and an element for operating the front actuator and the rear actuator during failure of at least one component of the dual-circuit pressure medium actuation system, the failure operating element comprising: an element for disconnecting, during failure of the at least one component, the rear actuator from the element for pressurizing the first chamber element of the rear actuator and from the element for pressurizing the second chamber element of the rear actuator; and an element for releasing, during failure of the at least one component, the pressure medium from at least one of the rear actuator first pressure chamber element and the rear actuator second pressure chamber element, upon the vehicle undergoing a rolling movement.

Another feature of the invention resides broadly in an active vehicle suspension control system with a dual-circuit pressure medium actuation system to eliminate a rolling movement of a vehicle, the active vehicle control system comprising: an element for sensing a motion parameter of a vehicle and for generating a signal representative thereof; a control unit element for processing the at least one signal representative of the motion parameter of a vehicle and for generating a valve element control signal; a front axle stabilizing arrangement; at least one actuator connecting to the front stabilizing arrangement; the at least one front actuator comprising a first pressure chamber element and a second pressure chamber element; the dual-circuit pressure medium actuation system comprising a first pressure medium circuit; the first pressure medium circuit comprising: an element for pressurizing the first chamber element of the front actuator for providing movement of the front actuator in a first direction; an element for pressurizing the second chamber element of the front actuator for providing movement of the front actuator in a second direction; and the front actuator second direction being opposite to the front actuator first direction; a rear axle stabilizing arrangement; at least one actuator connecting to the rear stabilizing arrangement; the at least one rear actuator comprising a first pressure chamber element and a second pressure chamber element; the dual-circuit pressure medium actuation system comprising a second pressure medium circuit; the second pressure medium circuit comprising: an element for pressurizing the first chamber element of the rear actuator for providing movement of the rear actuator in a first direction; an element for pressurizing the second chamber element of the rear actuator for providing movement of the rear actuator in a second direction; and the rear actuator second direction being opposite to the rear actuator first direction; the first pressure medium circuit comprising a first valve element for solely controlling pressure medium flow in the first pressure medium circuit in response to the valve element control signal; the second pressure medium circuit comprising a second valve element for solely controlling pressure medium flow in the second pressure medium circuit in response to the valve element control signal; and an element for operating the front actuator and the rear actuator during failure of at least one component of the dual-circuit pressure medium actuation system, the failure operating element comprising: an element for disconnecting, during failure of the at least one component, the rear actuator from the element for pressurizing the first chamber element of the rear actuator and from the element for pressurizing the second chamber element of the rear actuator; and an element for releasing, during failure of the at least one component, the pressure medium from at least one of the rear actuator first pressure chamber element and the rear actuator second pressure chamber element, upon the vehicle undergoing a rolling movement.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying figures.

DESCRIPTION OF THE PREFERRED EMBODIMENT

Figure 1:
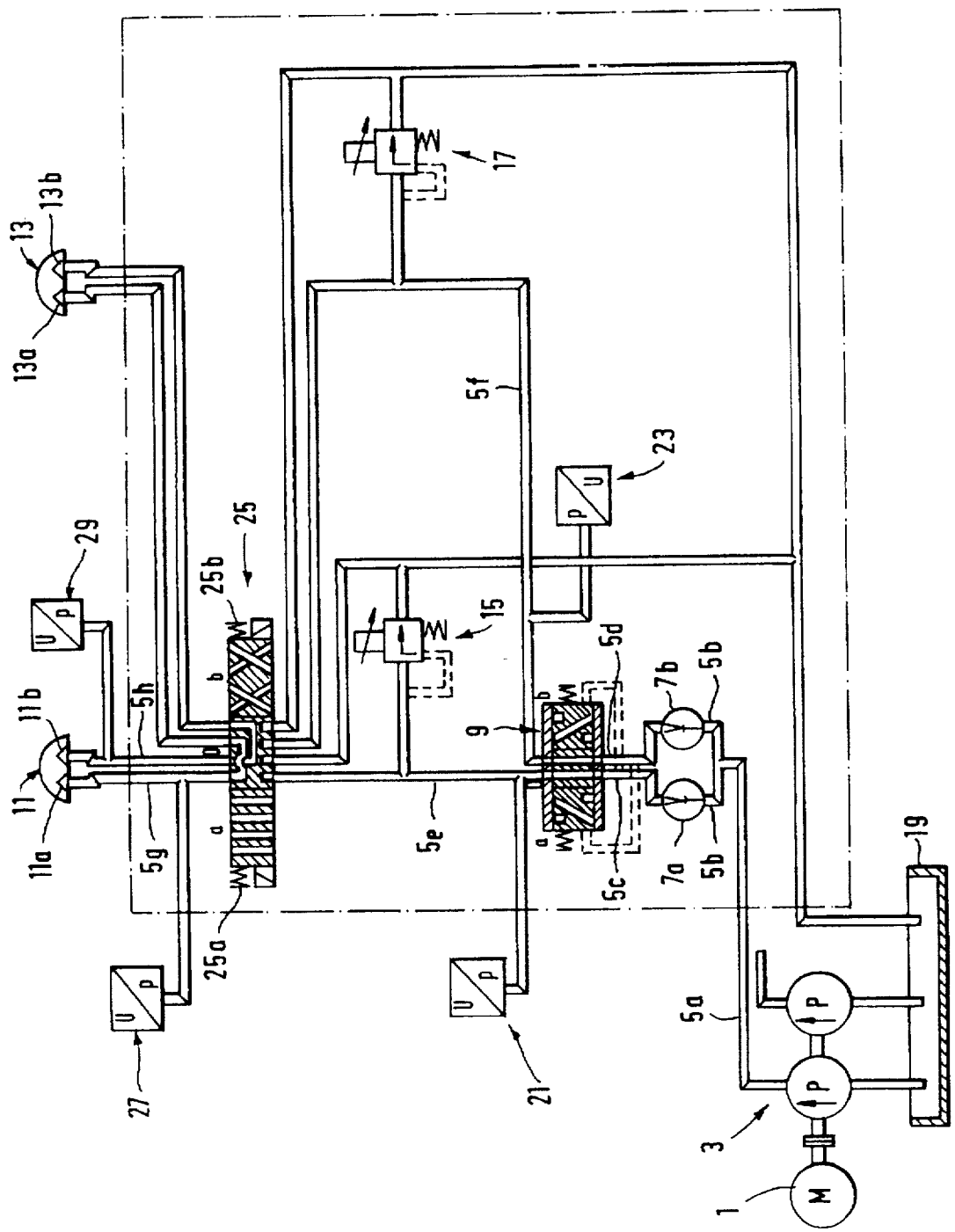
FIG. 1 is an overall view of the dual-circuit hydraulic system.

FIG. 1 shows a dual-circuit hydraulic system for an active vehicle control system, in which an engine 1, generally an internal combustion engine, propels a single-stage or multi-stage supply pump 3. Downstream from supply pump 3, a segment 5a of a supply line is split into two line segments 5b, whereby each segment 5b has a throttle orifice 7a or 7b as a component of a flow dividing or current dividing valve 9; that is, throttle orifice 7a is in one of the line segments 5b and throttle orifice 7b is in the other line segment 5b. The flow dividing valve 9 gives the segment 5e for an actuator 11 on the front axle of the vehicle the same supply priority as a segment 5f for an actuator 13 on the rear axle of the vehicle. The flow dividing valve 9 is able to give line segment 5e and line segment 5f the same supply priority because control lines which are connected to the segments 5c and 5d alternately switch the current dividing valve 9 to the open position. In practical terms, the current dividing valve 9 represents a pressure governor or pressure balance. Otherwise, the pressure level in the actuators has no influence on the distribution of the volume current between the front axle and the rear axle. The line segment 5e has an adjustable pressure control or pressure relief valve 15; the discharges of the relief valve 15 empty into a tank 19. The line segment 5f has an adjustable pressure control or pressure relief valve 17; the discharges of the relief valve 17 empty into the tank 19. To actuate the pressure control valve 15 there is a pressure sensor 21 in the line segment 5e of the supply lines. To actuate the pressure control valve 17 there is a pressure sensor 23 in the line segment 5f of the supply lines.

Figure 1A:
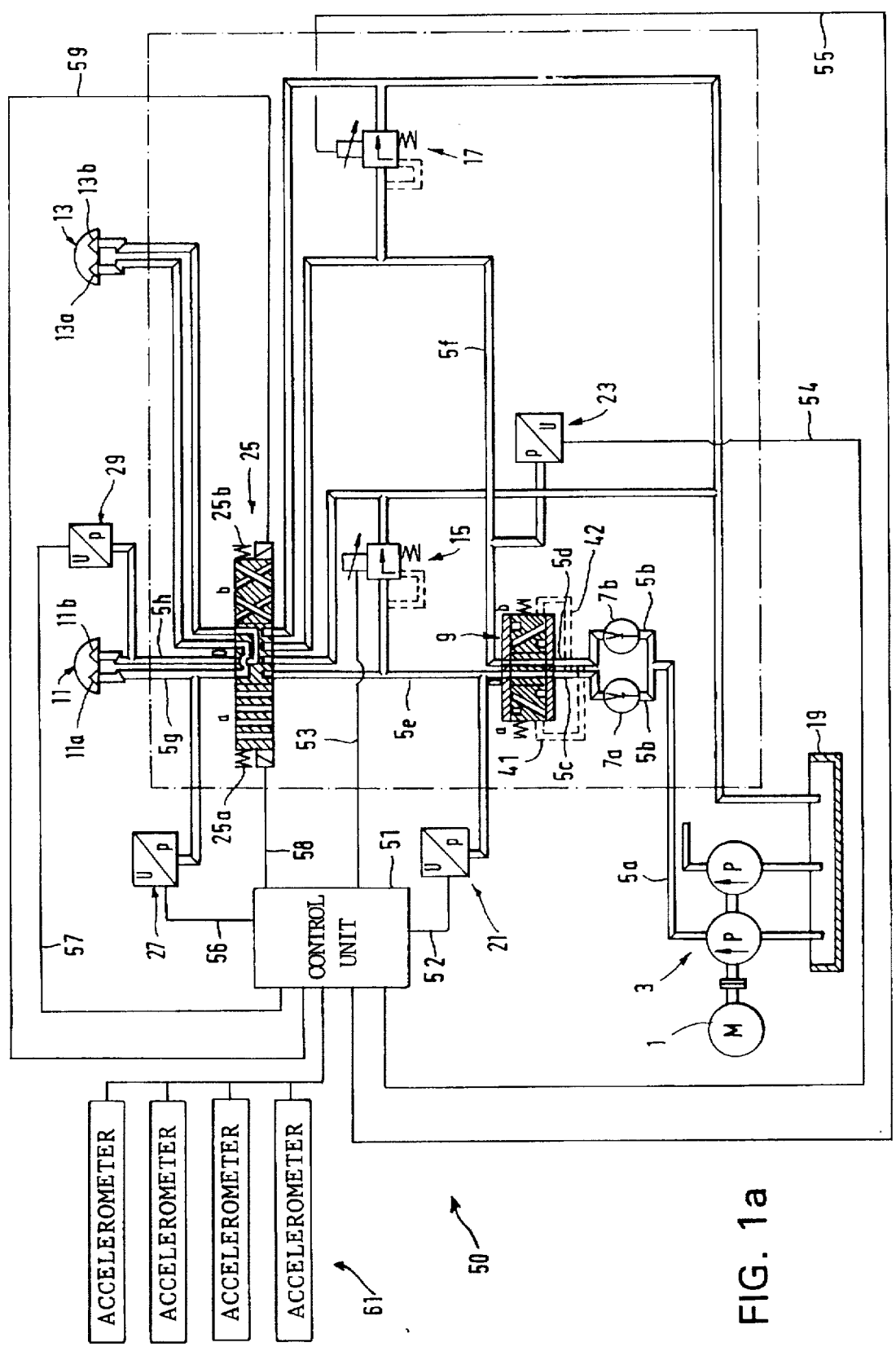
FIG. 1a is an overall view of the dual-circuit hydraulic system also showing a control system.

A further explanation of the flow dividing valve 9 is presented here in reference to FIG. 1a. The purpose of flow dividing valve 9 is to balance the pressure supply between the actuator 11 and the actuator 13. Specifically, the pressure in the supply lines to the actuators 11 and 13 will vary as a result of forces applied to the actuators 11 and 13 by the vehicle when the vehicle is driven; that is, the forces of the vehicle on the actuators 11 and 13 will affect the pressure in the hydraulic lines, so that the pressures in the hydraulic lines are not just the result of the pressure from the supply pump 3. When the pressure drops in line segment 5d compared to the pressure of line segment 5c, there will be a pressure drop in control line 41 compared to the control line 42 (shown in broken lines). If the pressure in line segment 5d is substantially lower than the pressure in line segment 5c, then the pressure in control line 41 will be substantially lower than the pressure in control line 42 and will cause flow dividing valve 9 to switch from the "0" position to the "a" position thereby blocking flow between line segment 5c and line segment 5e and at the same time diverting the higher pressure of line segment 5c to line segment 5f. In addition, position "a" of dividing valve 9 blocks flow from line segment 5d, so that pump 3 will increase the pressure in line segment 5d. At the same time, flow from line segment 5c is diverted to line segment 5f, so that the pressure in line segment 5c will tend to fall relative to the pressure of line segment 5d. Thus, the pressures in line segments 5c and 5d will start to balance again, and the pressures in the control lines 41 and 42 will also equilibrate and will cause flow dividing valve 9 to return to the "0" position, which position "0" dividing valve 9 will remain in as long as the pressures in line segments 5c and 5d are similar. In a similar manner as just described, flow dividing valve 9 will move into position "b" if pressure in line segment 5c drops with respect to pressure in line segment 5d.

Line segments 5e and 5f are separated from the actuators 11 and 13 by a flow control valve or shuttle valve 25 which is realized in the form of an 8/3-way valve. In the switch position "a", one pressure connection and one discharge connection per actuator are switched to open. Specifically, in the switch position "a", the working chambers which have the index "a" (working chambers 11a and 13a) are connected to the pressure supply, and the working chambers which have the index "b" (working chambers 11b and 13b) are connected to the tank 19. In a middle switch position "0", all the pressure and discharge connections of line segments 5e, 5f and of the discharge lines to the tank 19 are closed. At the same time in the middle switch position "0", the working chambers 11a, 11b, 13a, and 13b which have the same orientation are connected, i.e. working chamber 11a is connected with working chamber 13a, and working chamber 11b is connected with working chamber 13b, so that the hydraulic fluid can be transferred by pumping between the actuators of the vehicle axles, which essentially guarantees that the two stabilizers will have an equal hydraulic effect, but as a result of a corresponding sizing of the stabilizer on the front axle, there is a greater effect on the front axle. In the switch position "b", the working chambers which have the index "b" (working chambers 11b and 13b) are connected to the pressure supply, and the working chambers which have the index "a" (working chambers 11a and 13a) are connected to the tank 19.

Above, reference is made to working chambers with the same orientation. Specifically, chamber 11a of the front axle actuator 11 is said to have the same orientation as chamber 13a of the rear axle actuator 13. A possible specific application would be that when chamber 11a is pressurized the right side of the vehicle would be raised relative to the left side of the vehicle, and similarly when chamber 13a is pressurized the right side of the vehicle would be raised relative to the left side of the vehicle. Thus, the chambers with the same orientation when pressurized will oppose vehicle roll in the same direction.

The switch positions "a" and "b" of the shuttle valve 25 are the ones which are predominantly set when the vehicle negotiates curves in different directions, so that the actuators 11, 13 can counteract the rolling of the vehicle. The switching position "0" is selected when the vehicle is travelling in a straight line. When the switch position "0" of shuttle valve 25 is selected, the stabilizers are practically deactivated, since they can transfer fluid by pumping internally. At the same time, the pressure control valves 15 and 17 are set to open, so that the supply pump 3 need only build up a minimal operating pressure.

In emergency operation, for example if the shuttle valve 25 does not have any power supply, the shuttle valve 25 is switched by means of a corresponding bias applied by valve springs 25a and 25b into the middle switch position "0".

If a leak should occur in one of the supply lines 5g or 5h, the leak can be detected by means of a cross-comparison of the pressure sensors 21 and 23 and the pressure sensors 27 and 29. In this case, too, the shuttle valve 25 switches into the emergency operating position "0". Of course, this action comes at the expense of the fact that the actuator on the rear axle is leaking via the supply lines 5g and/or 5h, but it essentially guarantees that the stabilizer on the rear axle will in no case be more effective than the stabilizer on the front axle. That is, if there is a leak in supply line 5g or 5h and the shuttle valve 25 switches to the "0" position, then at least one of the supply lines to actuator 13 can also leak through the leak in supply line 5g and/or 5h (depending on which line has the leak, and it is possible, though unlikely, for both line 5g and line 5h to leak simultaneously). The leak from the supply lines to the rear axle actuator 13, essentially ensures that the stabilizer on the rear axle will in no case be more effective than the stabilizer on the front axle, thereby preventing oversteer.

Figure 2:
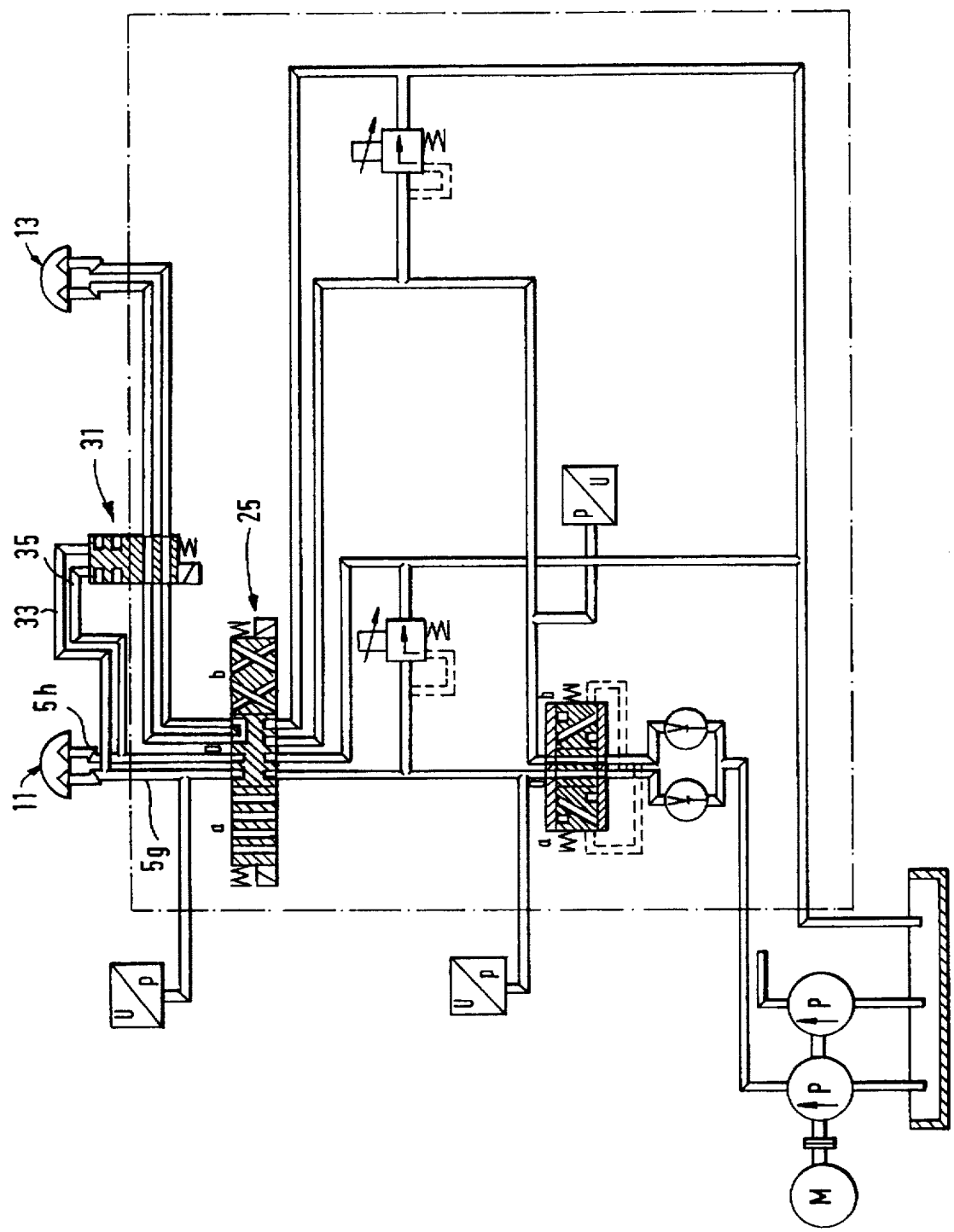
FIG. 2 is an illustration of an embodiment with an emergency operation shuttle valve.

The embodiment illustrated in FIG. 2 differs from that of FIG. 1 primarily by a different interconnection of the supply lines in the switch position "0" of the shuttle valve 25, and the embodiment also differs by the use of an emergency operation shuttle valve 31. In the event of a power failure on the shuttle valve 25, the shuttle valve 25 switches into the middle switch position, "0", so that the actuator 11 on the front axle is completely blocked. As a reaction force to the front axle stabilizer, a pressure builds up in the segments 5g and/or 5h, which pressure is propagated in control lines 33 and/or 35, which switch the emergency operating shuttle valve 31 out of a position in which it is generally set to open (as pictured in FIG. 2) into a closed position, since the electrical actuation of the emergency operating shuttle valve 31 is deactivated in the event of a failure of the power supply to the shuttle valve 25. In this case, both stabilizers are fully effective.

That is, in the event of power failure the shuttle valve 25 is switched into the middle switch position, "0". The middle position, "0", of shuttle valve 25 connects the two chambers of actuator 13 to one another; chamber 13a is connected to 13b (see FIG. 2a) by way of line segment 5i being connected to line segment 5j (see FIG. 2a), thereby allowing hydraulic fluid to pass freely between chamber 13a and 13b, so that the rear actuator is essentially not affective. At the same time, the middle position, "0", of shuttle valve 25 blocks both line segments 5g and 5h to actuator 11. By blocking line segments 5g and 5h, actuator 11 is held in an essentially fixed position, so that the front axle stabilizer remains effective. However, when the vehicle is driven, the stabilizer assembly will apply a force to the actuator 11, which force will cause pressure to build in line segments 5g and/or 5h. The pressure in line segments 5g and 5h will be transmitted to control lines 33 and 35, respectively. The pressure in control lines 33 and 35 will change the position of the emergency shuttle valve 31 from the open position (as shown in FIG. 2) to the closed position, so that both line segments 5i and 5j (see FIG. 2a) to actuator 13 are blocked. When the power to shuttle valve 25 fails, the electrical actuation of emergency shuttle valve 31 is deactivated, thereby allowing emergency shuttle valve 31 to move into the closed position if there is adequate pressure in the control lines 33 and 35. Thus, actuator 13 is also held in an essentially fixed position, so that the rear axle stabilizer remains effective. Thus, both the front stabilizer and rear stabilizer remain effective in the event of power failure to shuttle valve 25. To emphasize, position "0" of the shuttle valve 25 connects the two chambers of actuator 13 to one another, but the emergency shuttle valve 31 makes it possible to block the two chambers of actuator 13, even when shuttle valve 25 is in position "0".

When there is a leak in line segments 5g, 5h, and the shuttle valve 25 is in position "0", then essentially no reaction force can build up. Consequently, the emergency operation shuttle valve 31 remains in the open position, so that the actuator 13 on the rear axle can transfer fluid by pumping via the connection in the shuttle valve 25. The actuator 13 is therefore also deactivated. In practical terms, the control line is represented by pressure sensors.

That is, when shuttle valve 25 is in the middle position, "0", if there is a hydraulic fluid leak from line segment 5g and/or 5h there will be a lowering of the pressure in at least one of the control lines 33 and 35. Consequently, the emergency operation shuttle valve 31 remains in or is moved to the open position (as pictured in FIG. 2), so that fluid pumps freely between the opposing chambers of actuator 13, and actuator 13 is thereby deactivated. Thus, actuator 13 on the rear axle is essentially never more effective than actuator 11 on the front axle, so that oversteering is prevented. In FIG. 2 the control lines 33 and 35 are shown directly connected to the emergency operation shuttle valve 31. The control lines 33 and 35 can be connected to pressure sensors, which pressure sensors function to control emergency operation shuttle valve 31.

The actuators can be all types of known actuators, such as shunt motors and dual-action adjustment cylinders. Although the working chambers are designated "a" or "b", the number of working chambers is not limited to two; there can also be a plurality of working chambers which have the same index, e.g. when a shunt motor is used. Likewise, there can also be a plurality of actuators on each vehicle axle.

The shuttle valve 25 is a multi-way valve or more specifically an 8/3-way valve. Meaning, the shuttle valve has eight connections and three positions. The three positions of shuttle valve 25 are "a", "O", and "b" and were discussed above in detail. The shuttle valve 25 can have a slide which allows it to move among the three valve positions, each of the three positions of the slide interconnect the eight line connections in a different manner, again described above in detail. In other words shuttle valve 25 is a switching valve, which switches the line connections by switching among three valve positions. The movement of the shuttle valve 25 can possibly be controlled by solenoids or by pilot valves. Flow dividing valve 9 can in part be a valve that is similar to shuttle valve 25, but flow dividing valve 9 has four connections and three positions. Emergency shuttle valve 31 is also similar but has four connections and two positions.

Referring back to FIG. 1a, also shown is a control system 50 having a control unit 51. Hydraulic line 5e has pressure sensor 21, which pressure sensor 21 is connected to control unit 51 by signal wire 52. If the sensor 21 indicates a high pressure, then control unit 51 will open pressure control valve 15 via signal wire 53. Hydraulic line 5f has pressure sensor 23, which pressure sensor 23 is connected to control unit 51 by signal wire 54. If the sensor 23 indicates a high pressure, then control unit 51 will open pressure control valve 17 via signal wire 55. One situation when pressure control valves 15 and 17 are opened is when shuttle valve 25 is in the middle position, "O", thereby blocking the hydraulic supply lines 5e and 5f. In addition, hydraulic line 5g has pressure sensor 27, which pressure sensor 27 is connected to control unit 51 by signal wire 56. Similarly, hydraulic line 5h has pressure sensor 29, which pressure sensor 29 is connected to control unit 51 by signal wire 57. A leak in one of the hydraulic lines 5g or 5h can be detected by a cross comparison among all of the pressure sensors 21, 23, 27, and 29. If a leak is detected the shuttle valve 25 is switched to the emergency position, "O", via control wires 58 and 59. In addition, the control system 50 comprises accelerometers 61, which sense the changes in motion and driving direction of the vehicle and prompt the control unit 51 to switch shuttle valve 25 to the appropriate position via control wires 58 and 59.

Figure 2A:
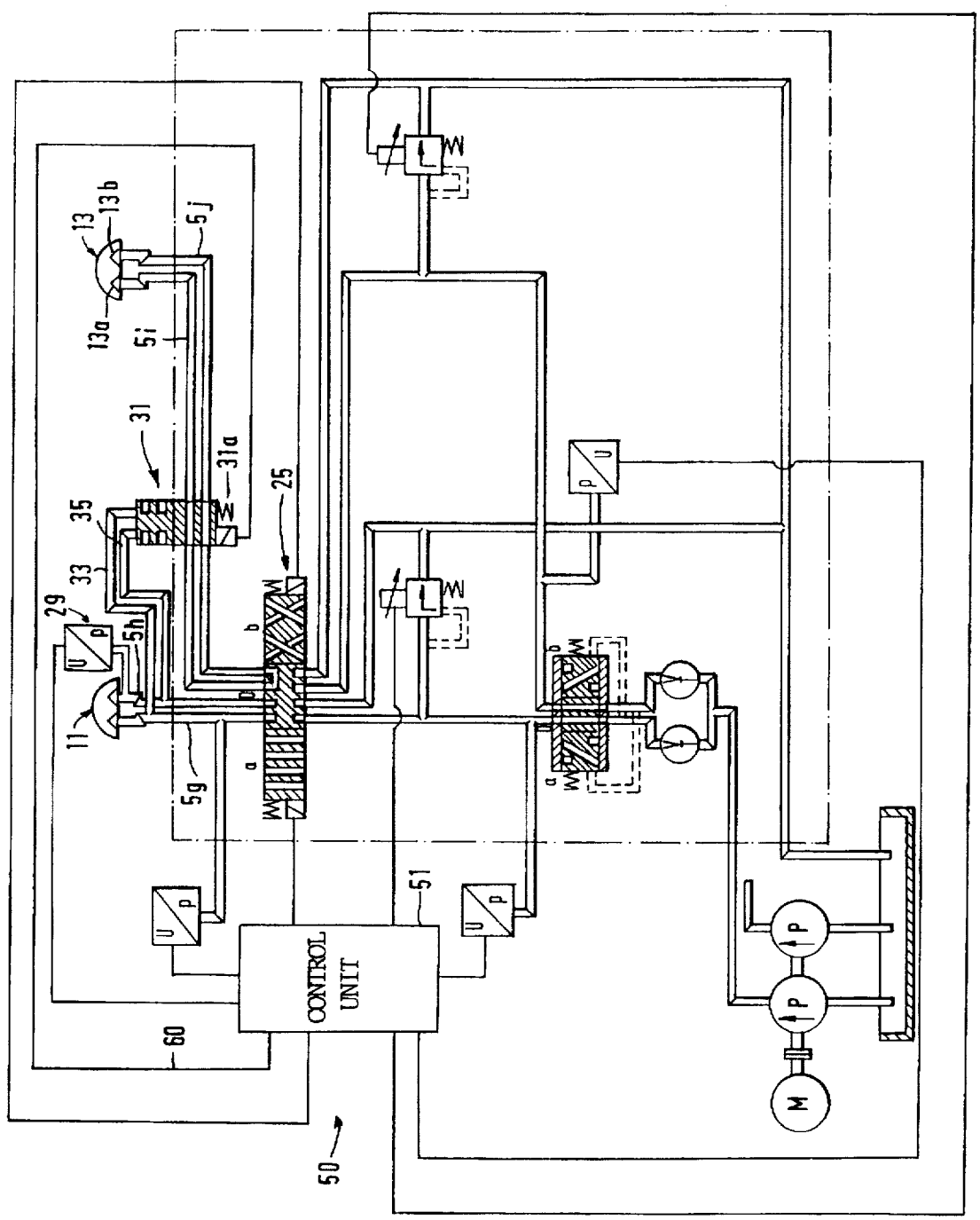
FIG. 2a is an illustration of an embodiment with an emergency operation shuttle valve also showing a control system.

FIG. 2a illustrates the embodiment of FIG. 2 with a control system 50. The control system 50 is similar to the control system 50 of FIG. 1a, except that control unit 51 has an additional signal wire 60 to control emergency operation shuttle valve 31. When the system is functioning normally, emergency operation shuttle valve 31 is held in the open position (as pictured in FIG. 2a) by control unit 51 via signal wire 60. In the event of a power failure, shuttle valve 25 is biased to be in the emergency position, "O". At the same time, signal wire 60 no longer keeps emergency operation shuttle valve 31 in the open position, so that if there is adequate pressure in line segments 5g and 5h, emergency operation shuttle valve 31 can move to the closed position as was discussed in reference to FIG. 2. In the event of a complete failure of the system which utilizes the pressure in control lines 33 and 35 to control emergency operation shuttle valve 31, then the bias spring 31a will hold emergency operation shuttle valve 31 in the open position. FIG. 2a also shows pressure sensor 29, similar to FIG. 1 and FIG. 1a. The accelerometers are not illustrated in FIG. 2a for convenience, but the control system 50 can preferably include accelerometers.

Figure 3:
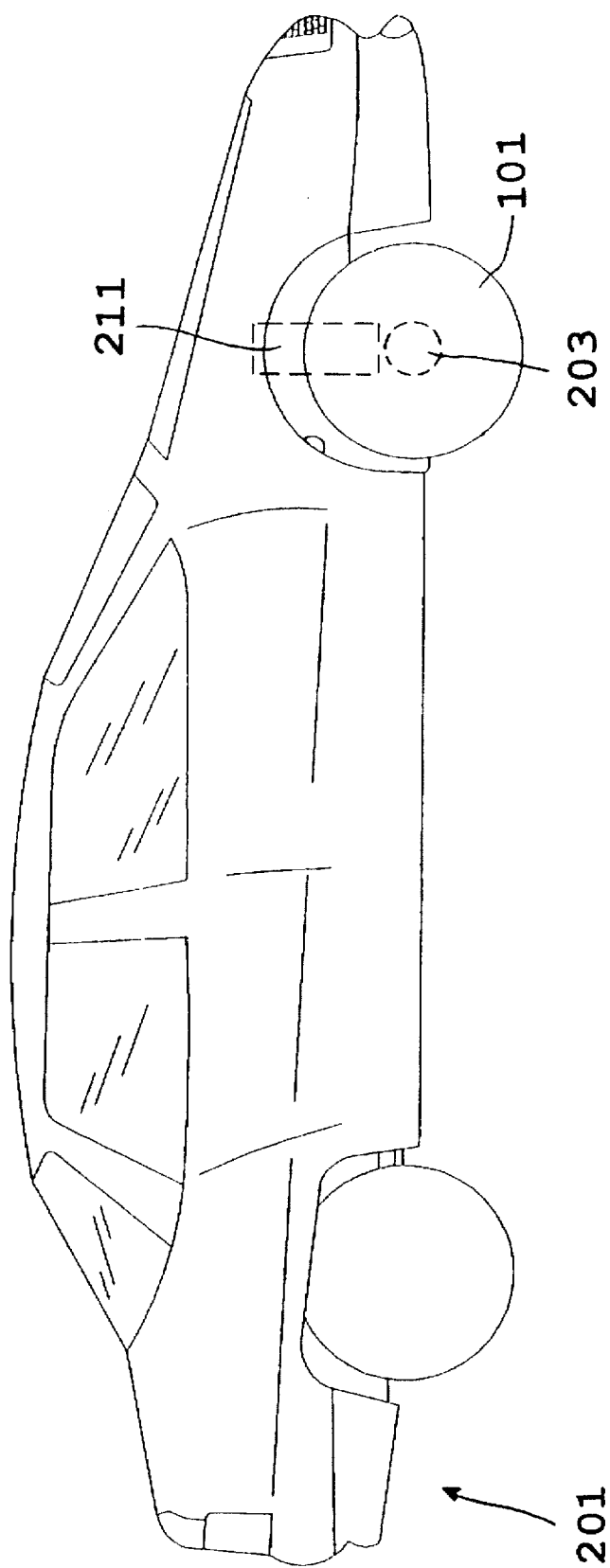
FIG. 3 is an illustration of an automobile having a suspension wheel unit.

FIG. 3 illustrates an automobile 201 which may employ the dual-circuit hydraulic system of the present invention in the active vehicle control system. A wheel 101 is supported on an axle 203. The wheel 101 and axle 203 are in turn connected to the body of automobile 201 by a suspension system 211.

Figure 4:
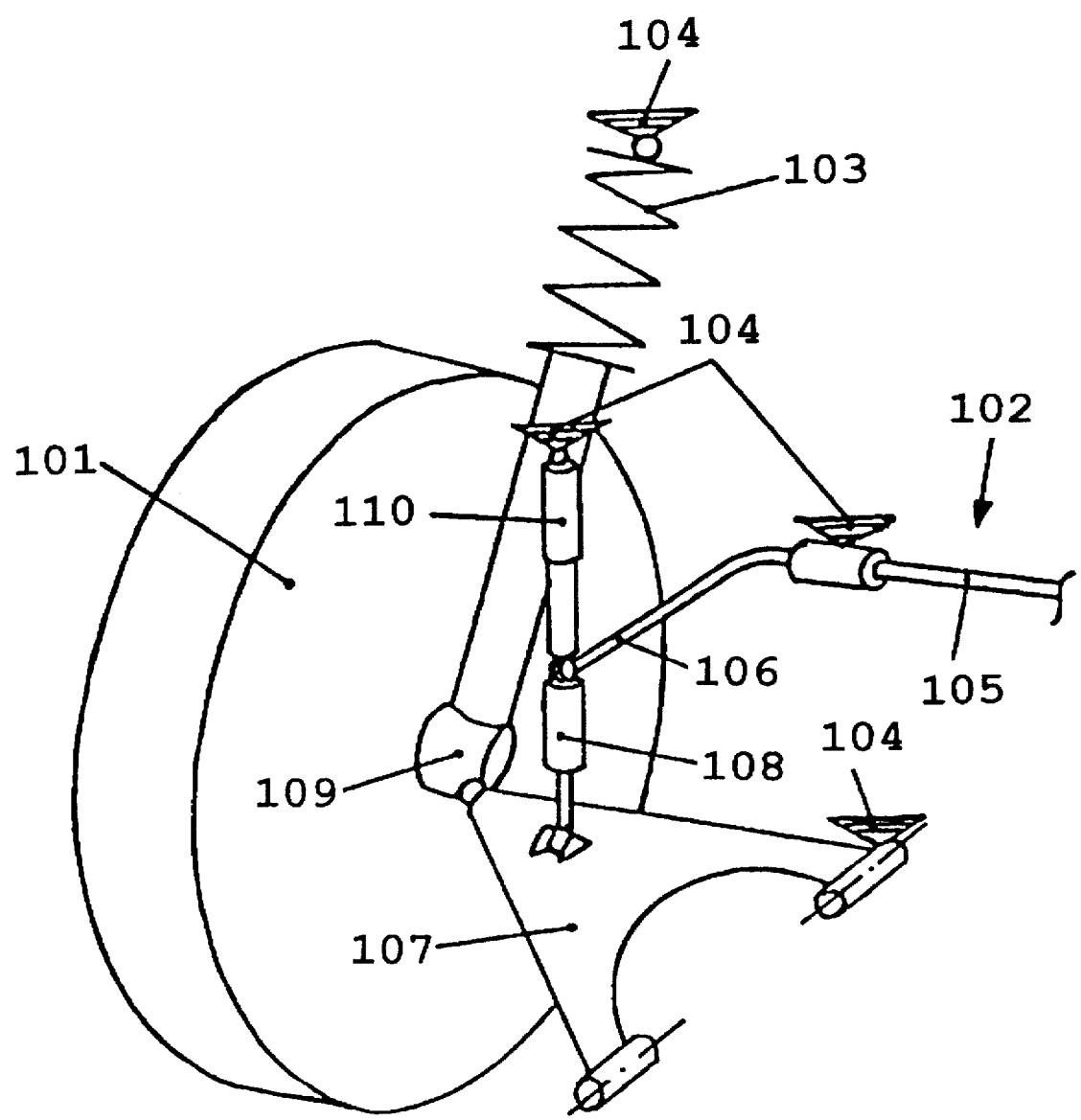
FIG. 4 is an illustration of a suspension wheel unit with a stabilizer unit in place.

FIG. 4 illustrates the axle 203 and suspension system 211 of FIG. 3 in greater detail. The axle 203 and suspension system 211 work together as a unit, so the components illustrated in FIG. 4 collectively make up both the axle 203 and the suspension system 211, so there is no distinction made between the axle 203 and the suspension system 211 in the description of FIG. 4. A U-shaped stabilizer 102 is shown as part of a vehicle suspension system, which U-shaped stabilizer 102 has an actuator 108, which actuator 108 can be controlled by the present dual-circuit hydraulic system. The suspension system shows wheel 101 mounted on wheel bearing 109, which wheel bearing 109 is connected to strut 103 and suspension arm 107. Suspension arm 107 is pivotally mounted on the vehicle body 104, so that wheel 101 can move up and down with the swinging end of suspension arm 107. Strut 103 is connected to vehicle body 104, and strut 103 both supports the body 104 with a spring and also functions as a shock absorber. U-shaped stabilizer 102 has a torsion rod 105 which torsion rod 105 is mounted on the vehicle body 104, so that the torsion rod 105 is able to pivot on its longitudinal axis. The torsion rod 105 has a stabilizer arm 106 which is mounted on the suspension arm 107 by way of actuator 108. In addition, torsion rod 105 is similar on its other end and has an additional stabilizer arm (not shown) mounted on the suspension arm of the corresponding wheel (the torsion rod 105 is connected to the suspension arms of either both front wheels or both rear wheels).

The actuator 108 has at least two working chambers which oppose one another and can be controlled by one of the dual-circuit hydraulic systems shown in FIGS. 1 and 2. The actuator 108 functions by controlling the movement between the end of stabilizer arm 106 and suspension arm 107, thereby controlling the stabilizing characteristics of the U-shaped stabilizer 102. The stabilizer arm 106 is also connected to vehicle body 104 by shock absorber 110, which shock absorber 110 helps support and control both the end of stabilizer arm 106 and actuator 108. The end of the torsion rod 105, not shown in FIG. 4, has a similar stabilizer arm (as discussed above); the stabilizer arm not shown can be connected to its corresponding suspension arm in a similar manner as shown in FIG. 4, by way of an actuator, or the stabilizer arm not shown can be connected to its corresponding suspension arm without the use of an actuator. A second actuator on torsion rod 105 is more versatile, but the system is still functional with a single actuator per axle and at the same time is simpler and more economical. An additional embodiment could possibly use a rotary actuator at the center of the torsion rod 105.

One feature of the invention resides broadly in the dual-circuit hydraulic system for an active vehicle control system to eliminate a rolling movement of a motor vehicle by means of an adjustable stabilizer on a motor vehicle front axle and on a motor vehicle rear axle, comprising at least one supply pump which uses at least one shuttle valve or flow control valve to supply, by means of supply lines, at least one dual-action actuator which has at least two working chambers, one actuator on each stabilizer, with a pressure medium, characterized by the fact that in emergency operation of the shuttle valve 25, the working chambers 13a, 13b of the at least one actuator 13 on the rear axle are unblocked, so that in the event of a rolling movement of the vehicle, the pressure medium is transferred by being pumped out of the working chambers of the rear axle actuator by the rear axle stabilizer.

Another feature of the invention resides broadly in the dual-circuit hydraulic system characterized by the fact that an 8/3-way valve is used as the shuttle valve 25 to supply the two actuators 11, 13 on the vehicle axles.

Yet another feature of the invention resides broadly in the dual-circuit hydraulic system characterized by the fact that in the emergency operating position "0", the shuttle valve 25 connects the working chambers which have the same connection orientation a, b on both vehicle axles.

Still another feature of the invention resides broadly in the dual-circuit hydraulic system characterized by the fact that in the emergency operating position "0", the shuttle valve 25 blocks the working chambers 11a, 11b of the actuator on the front axle, and the working chambers 13a, 13b of the actuator on the rear axle are connected to one another.

A further feature of the invention resides broadly in the dual-circuit hydraulic system characterized by the fact that the supply lines 5g, 5h of the front axle, between the shuttle valve 25 and the actuator 11, each have a pressure sensor 27, 29 which is used to detect leaks in the supply lines.

Another feature of the invention resides broadly in the dual-circuit hydraulic system characterized by the fact that between the shuttle valve 25 and the actuator 13 on the rear axle there is an emergency operation shuttle valve 31 which emergency shuttle valve 31 is fed by means of a control line system 33, 35 from supply lines 5g, 5h between the shuttle valve and the actuator of the front axle which is actuated so that in the emergency operating position of the shuttle valve 25 and when the pressure conditions in the supply lines 5g, 5h are intact, the emergency operation shuttle valve 31 is set in the closed position.

Some examples of suspension control systems can be found in the following: U.S. Pat. No. 5,228,719, entitled "Automotive Active Suspension System for Anti-Rolling Control"; U.S. Pat. No. 5,231,583 to Lizell, entitled "Method and Apparatus for Dynamic Leveling of a Vehicle Using an Active Suspension System"; U.S. Pat. No. 5,195,772 to Bachrach, Levitt, and Nametz, entitled "Valve Configuration for Converting an Active Suspension System Into a Passive Suspension System"; U.S. Pat. No. 5,183,127 entitled "Suspension-Traction Total Control System"; U.S. Pat. No. 5,208,749 entitled "Method for Controlling Active Suspension System on the Basis of Rotational Motion Model"; U.S. Pat. No. 5,299,488 to Kadlicko and Halina, entitled "Active Suspension System"; U.S. Pat. No. 5,322,319 entitled "Active Suspension Apparatus for a Vehicle"; U.S. Pat. No. 5,322,321 to Yopp, entitled "Vehicle Active Suspension System"; U.S. Pat. No. 4,700,812 entitled "Vehicular Suspension System," issued to Moser; U.S. Pat. No. 4,616,848 entitled "Automotive suspension control system with vehicle speed-dependent damping characteristics"; U.S. Pat. No. 4,669,749 entitled "Vehicle suspension apparatus"; U.S. Pat. No. 4,673,194 entitled "Automotive suspension control system with self-adjustment feature"; U.S. Pat. No. 4,761,022 entitled "Suspension controller for improved turning"; U.S. Pat. No. 5,481,459 entitled "Control system for an active suspension system in a motor vehicle and method for controlling motor vehicle handling around curves"; U.S. Pat. No. 5,390,948 entitled "Active vehicle suspension system and a control method therefor"; U.S. Pat. No. 5,475,593 entitled "Distributed active vehicle suspension system"; and Federal Republic of Germany Patent No. DE 39 36 987 A1 with inventors Karnopp et al. assigned to Mecedes-Benz.

Some types of automobile suspension systems may be or are disclosed by the following U.S. Pat. Nos. 5,178,406 to Reynolds, entitled "Torsion Bar Suspension"; 5,286,059 to Tabe, entitled "Height Control System when Vehicle Is Jacked Up"; 5,288,101 to Minnett, entitled "Variable Rate Torsion Control System for Vehicle Suspension"; and 5,290,048 to Takahashi and Yamashita, entitled "Working Fluid Circuit for Active Suspension Control System of Vehicle".

Some examples of hydraulic adjusting devices can be found in the following U.S. Pat. No. 5,377,638 entitled "Hydraulic adjusting device"; No. 5,396,923 entitled "Surge relief apparatus and method"; and No. 5,469,703 entitled "Device for controlling a hydraulic motor".

Some other examples of systems that could be used in conjunction with the present invention may be or are disclosed by the following U.S. Pat. Nos. 5,251,728 to Mund et al., entitled "Hydraulic Vibration Damper or Shock Absorber with Electrical Connector Therefor"; 4,785,920 to Knecht et al., entitled "Hydraulic Adjustable Shock Absorber"; 4,719,800 to Moser, entitled "Accelerometer"; 4,989,148 to Gürke et al., entitled "Apparatus for the Computer-Assisted Control of Vibration Dampers of a Vehicular Suspension System as a Function of the Roadway"; 4,749,070 to Moser et al., entitled "Hydraulic Vibration Damper Having Adjustable Damping Valve".

Examples of dual-acting hydraulic cylinders can be found in the following U.S. Pat. No. 5,253,503 entitled "Apparatus for counterbalancing and vertical bending of the work rolls of a four-high rolling mill stand".

Some examples of actuators can be found in the following U.S. Pat. No. 5,379,969 entitled "Hydraulic actuator with mechanical lock and installation"; No. 5,398,507 entitled "Hydraulic circuit system"; No. 5,410,946 entitled "Hydraulic actuator"; No. 5,415,199 entitled "Unit for controlling a plurality of hydraulic actuators"; No. 5,417,064 entitled "Apparatus for supplying hydraulic fluid to a hydraulic actuator"; No. 5,422,553 entitled "Servo actuator diagnostic monitoring"; No. 5,457,960 entitled "Hydraulic control system"; and No. 5,477,678 entitled "Hydraulic circuit system".

Examples of pressure sensors for hydraulic systems can possibly be found in the following U.S. Pat. No. 5,187,973 entitled "Leak monitor for hydraulic drive systems"; No. 5,217,247 entitled "Suspension control system"; No. 5,217,284 entitled "Hydraulic dual-circuit brake system with dual pressure sensors and an active fluid reservoir"; No. 5,240,379 entitled "Hydraulic power unit"; and No. 5,258,913 entitled "Method and apparatus for leveling a body".

Examples of valves which could possibly be used in the present invention can be found in the following U.S. Pat. No. 4,922,803 entitled "Four-way valve"; No. 4,982,760 entitled "Three-way valve with radial seal"; No. 5,040,567 entitled "Multi-way valve"; No. 5,069,037 entitled "Fluid supply system for vehicles"; No. 5,295,513 entitled "Pilot valve apparatus"; No. 5,385,170 entitled "Multiway valve"; No.

5,419,367 entitled "Solenoid valve"; No. 5,477,770 entitled "Valve control unit for hydraulic actuator"; No. 5,437,216 entitled "Universal hydraulic valve"; and No. 5,474,107 entitled "Fail-open solenoid actuated valve".

Examples of shuttle valves which could possibly be used in the present invention can be found in the following U.S. Pat. No. 5,201,174 entitled "Auxiliary hydraulic pump system"; No. 5,271,227 entitled "Hydraulic apparatus with pressure compensating valves"; No. 5,315,827 entitled "Apparatus for switching flow rate for attachment"; No. 5,329,968 entitled "Shuttle valve"; and No. 5,181,656 entitled "Water recirculating apparatus".

Examples of switching valves which could possibly be used in the present invention can be found in the following U.S. Pat. No. 5,190,077 entitled "Switchover valve"; No. 5,201,803 entitled "Hydraulic system for a vehicle"; No. 5,259,293 entitled "Hydraulic control device"; and No. 5,261,232 entitled "Valve system for supplying fluid from a pair of fluid pressure sources to a load".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 13 468.0, filed on Apr. 8, 1995, having inventor Stefan Schiffler, and DE-OS 195 13 468.0 and DE-PS 195 13 468.0, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. An active vehicle suspension control system with a dual-circuit pressure medium actuation system to eliminate a rolling movement of a vehicle, said active vehicle control system comprising:

a front axle stabilizing arrangement;
at least one actuator connecting to said front stabilizing arrangement;
said at least one front actuator comprising a first pressure chamber and a second pressure chamber;
said dual-circuit pressure medium actuation system comprising a first pressure medium circuit;
said first pressure medium circuit comprising:
 means for pressurizing said first pressure chamber of said front actuator for providing movement of said front actuator in a first direction;
 means for pressurizing said second pressure chamber of said front actuator for providing movement of said front actuator in a second direction; and
 said front actuator second direction being opposite to said front actuator first direction;
a rear axle stabilizing arrangement;
at least one actuator connecting to said rear stabilizing arrangement;
said at least one rear actuator comprising a first pressure chamber and a second pressure chamber;
said dual-circuit pressure medium actuation system comprising a second pressure medium circuit;
said second pressure medium circuit comprising:
 means for pressurizing said first pressure chamber of said rear actuator for providing movement of said rear actuator in a first direction;
 means for pressurizing said second pressure chamber of said rear actuator for providing movement of said rear actuator in a second direction; and
 said rear actuator second direction being opposite to said rear actuator first direction;
said first pressure medium circuit comprising first valve means for solely controlling pressure medium flow in said first pressure medium circuit;
said second pressure medium circuit comprising second valve means for solely controlling pressure medium flow in said second pressure medium circuit; and
means for operating said front actuator and said rear actuator during failure of at least one component of the dual-circuit pressure medium actuation system, said failure operating means comprising:
 means for disconnecting, during failure of said at least one component, said rear actuator from said means for pressurizing said first pressure chamber of said rear actuator and from said means for pressurizing said second pressure chamber of said rear actuator; and
 means for releasing, during failure of said at least one component, the pressure medium from at least one of said rear actuator first pressure chamber and said rear actuator second pressure chamber, upon the vehicle undergoing a rolling movement.

2. The active vehicle suspension control system of claim 1, wherein said first valve means, said second valve means, and said means for operating said front and rear actuators during failure of at least one component of the dual-circuit pressure medium actuation system comprises a multiple position valve.

3. The active vehicle suspension control system of claim 2, wherein:

said multiple position valve has a first position;
said first position of said multiple position valve comprises means for connecting one of said first pressure chamber and said second pressure chamber of said front actuator to one of said first pressure chamber and said second pressure chamber of said rear actuator to reduce oversteer of the vehicle; and
said first position of said multiple position valve comprises means for connecting the other of said first pressure chamber and said second pressure chamber of said front actuator to the other of said first pressure chamber and said second pressure chamber of said rear actuator to reduce oversteer of the vehicle.

4. The active vehicle suspension control system of claim 3, wherein:

said multiple position valve is a three position valve;

said three position valve has eight pressure medium connections;

said front stabilizing arrangement comprises a front stabilizer bar, which front stabilizer bar comprises a mid-portion for connecting to a vehicular body, and which front stabilizer bar comprises at least one end portion for connecting to said at least one front actuator;

said mid portion of said front stabilizer bar is substantially transverse to said at least one end portion of said front stabilizer bar;

said rear stabilizing arrangement comprises a rear stabilizer bar, which rear stabilizer bar, comprises a mid-portion for connecting to a vehicular body, and which rear stabilizer bar comprises at least one end portion for connecting to said at least one rear actuator;

said mid portion of said rear stabilizer bar is substantially transverse to said at least one end portion of said rear stabilizer bar; and said first pressure medium circuit comprises:
- a first pressure medium connection between said three position valve and said first pressure chamber of said front actuator;
- a first pressure sensor for detecting a leak in said first pressure medium connection;
- a second pressure medium connection between said three position valve and said second pressure chamber of said front actuator; and
- a second pressure sensor for detecting a leak in said second pressure medium connection.

5. The active vehicle suspension control system of claim 2, wherein:

said multiple position valve has a first position;

said first position of said multiple position valve comprises means for blocking pressure medium flow from said first pressure chamber of said front actuator;

said first position of said multiple position valve comprises means for blocking pressure medium flow from said second pressure chamber of said front actuator; and said first position of said multiple position valve comprises means for connecting said first pressure chamber of said rear actuator to said second pressure chamber of said rear actuator to reduce oversteer of the vehicle.

6. The active vehicle suspension control system of claim 5, wherein:

said first pressure medium circuit comprises:
- a first pressure medium connection between said multiple position valve and said first pressure chamber of said front actuator;
- means for detecting a pressure change in said first pressure medium connection;
- a second pressure medium connection between said multiple position valve and said second pressure chamber of said front actuator; and
- means for detecting a pressure change in said second pressure medium connection.

7. The active vehicle suspension control system of claim 6, wherein said second pressure medium circuit comprises means for controlling pressure medium flow between said multiple position valve and said rear actuator.

8. The active vehicle suspension control system of claim 7, wherein said means for controlling pressure medium flow between said multiple position valve and said rear actuator comprises means for blocking pressure medium flow between said multiple position valve and said rear actuator upon said multiple position valve being in said first position, said first pressure medium connection being pressurized in a first predetermined pressure range, and said second pressure medium connection being pressurized in a second predetermined pressure range.

9. The active vehicle suspension control system of claim 8, wherein:

said multiple position valve is a three position valve;

said three position valve has eight pressure medium connections;

said front stabilizing arrangement comprises a front stabilizer bar, which front stabilizer bar comprises a mid-portion for connecting to a vehicular body, and which front stabilizer bar comprises at least one end portion for connecting to said at least one front actuator;

said mid portion of said front stabilizer bar is substantially transverse to said at least one end portion of said front stabilizer bar;

said actuator stabilizing arrangement comprises a rear stabilizer bar, which stabilizer bar comprises a mid-portion for connecting to a vehicular body, and which stabilizer bar comprises at least one end portion for connecting to said at least one rear actuator;

said mid portion of said rear stabilizer bar is substantially transverse to said at least one end portion of said rear stabilizer bar;

said means for detecting a pressure change in said first pressure medium connection comprises a pressure sensor for detecting a leak in said first pressure medium connection; and said means for detecting a pressure change in said second pressure medium connection comprises a pressure sensor for detecting a leak in said second pressure medium connection.

10. The active vehicle suspension control system of claim 1, wherein said first valve means, said second valve means, and said means for operating said front and rear actuators during failure of at least one component of the dual-circuit pressure medium actuation system comprises a three position valve.

11. An active vehicle suspension control system with a dual-circuit pressure medium actuation system to eliminate a rolling movement of a vehicle, said active vehicle control system comprising:

means for sensing a motion parameter of a vehicle and for generating a signal representative thereof;

control unit means for processing said signal representative of the motion parameter of a vehicle and for generating a valve means control signal;

a front axle stabilizing arrangement;

at least one actuator connecting to said front stabilizing arrangement;

said at least one front actuator comprising a first pressure chamber and a second pressure chamber;

said dual-circuit pressure medium actuation system comprising a first pressure medium circuit;

said first pressure medium circuit comprising:

means for pressurizing said first pressure chamber of said front actuator for providing movement of said front actuator in a first direction;

means for pressurizing said second pressure chamber of said front actuator for providing movement of said front actuator in a second direction; and said front actuator second direction being opposite to said front actuator first direction;

a rear axle stabilizing arrangement;

at least one actuator connecting to said rear stabilizing arrangement;

said at least one rear actuator comprising a first pressure chamber and a second pressure chamber;

said dual-circuit pressure medium actuation system comprising a second pressure medium circuit;

said second pressure medium circuit comprising:

means for pressurizing said first pressure chamber of said rear actuator for providing movement of said rear actuator in a first direction;

means for pressurizing said second pressure chamber of said rear actuator for providing movement of said rear actuator in a second direction; and said rear actuator second direction being opposite to said rear actuator first direction;

said first pressure medium circuit comprising first valve means for solely controlling pressure medium flow in said first pressure medium circuit in response to said valve means control signal;

said second pressure medium circuit comprising second valve means for solely controlling pressure medium flow in said second pressure medium circuit in response to said valve means control signal; and means for operating said front actuator and said rear actuator during failure of at least one component of the dual-circuit pressure medium actuation system, said failure operating means comprising:

means for disconnecting, during failure of said at least one component, said rear actuator from said means for pressurizing said first pressure chamber of said rear actuator and from said means for pressurizing said second pressure chamber of said rear actuator; and means for releasing, during failure of said at least one component, the pressure medium from at least one of said rear actuator first pressure chamber and said rear actuator second pressure chamber, upon the vehicle undergoing a rolling movement.

12. The active vehicle suspension control system of claim 11, wherein said first valve means, said second valve means, and said means for operating said front and rear actuators during failure of at least one component of the dual-circuit pressure medium actuation system comprises a multiple position valve.

13. The active vehicle suspension control system of claim 12, wherein:

said multiple position valve has a first position;

said first position of said multiple position valve comprises means for connecting one of said first pressure chamber and said second pressure chamber of said front actuator to one of said first pressure chamber and said second pressure chamber of said rear actuator to reduce oversteer of the vehicle; and said first position of said multiple position valve comprises means for connecting the other of said first pressure chamber and said second pressure chamber of said front actuator to the other of said first pressure chamber and said second pressure chamber of said rear actuator to reduce oversteer of the vehicle.

14. The active vehicle suspension control system of claim 13, wherein:

said multiple position valve is a three position valve;

said three position valve has eight pressure medium connections;

said front stabilizing arrangement comprises a front stabilizer bar, which front stabilizer bar comprises a mid-portion for connecting to a vehicular body, and which front stabilizer bar comprises at least one end portion for connecting to said at least one front actuator;

said mid portion of said front stabilizer bar is substantially transverse to said at least one end portion of said front stabilizer bar;

said rear stabilizing arrangement comprises a rear stabilizer bar, which rear stabilizer bar comprises a mid-portion for connecting to a vehicular body, and which rear stabilizer bar comprises at least one end portion for connecting to said at least one rear actuator;

said mid portion of said rear stabilizer bar is substantially transverse to said at least one end portion of said rear stabilizer bar; and said first pressure medium circuit comprises:

a first pressure medium connection between said three position valve and said first pressure chamber of said front actuator;

a first pressure sensor for detecting a leak in said first pressure medium connection;

a second pressure medium connection between said three position valve and said second pressure chamber of said front actuator; and a second pressure sensor for detecting a leak in said second pressure medium connection.

15. The active vehicle suspension control system of claim 12, wherein:

said multiple position valve has a first position;

said first position of said multiple position valve comprises means for blocking pressure medium flow from said first pressure chamber of said front actuator;

said first position of said multiple position valve comprises means for blocking pressure medium flow from said second pressure chamber of said front actuator; and said first position of said multiple position valve comprises means for connecting said first pressure chamber of said rear actuator to said second pressure chamber of said rear actuator to reduce oversteer of the vehicle.

16. The active vehicle suspension control system of claim 15, wherein:

said first pressure medium circuit comprises:

a first pressure medium connection between said multiple position valve and said first pressure chamber of said front actuator;

means for detecting a pressure change in said first pressure medium connection;

a second pressure medium connection between said multiple position valve and said second pressure chamber of said front actuator; and means for detecting a pressure change in said second pressure medium connection.

17. The active vehicle suspension control system of claim 16, wherein said second pressure medium circuit comprises means for controlling pressure medium flow between said multiple position valve and said rear actuator.

18. The active vehicle suspension control system of claim 17, wherein said means for controlling pressure medium flow between said multiple position valve and said rear actuator comprises means for blocking pressure medium flow between said multiple position valve and said rear actuator upon said multiple position valve being in said first position, said first pressure medium connection being pressurized in a first predetermined pressure range, and said second pressure medium connection being pressurized in a second predetermined pressure range.

19. The active vehicle suspension control system of claim 18, wherein:

said multiple position valve is a three position valve;

said three position valve has eight pressure medium connections;

said front stabilizing arrangement comprises a front stabilizer bar, which front stabilizer bar comprises a mid-portion for connecting to a vehicular body, and which front stabilizer bar comprises at least one end portion for connecting to said at least one front actuator;

said mid portion of said front stabilizer bar is substantially transverse to said at least one end portion of said front stabilizer bar;

said rear stabilizing arrangement comprises a rear stabilizer bar, which stabilizer bar comprises a mid-portion for connecting to a vehicular body, and which stabilizer bar comprises at least one end portion for connecting to said at least one rear actuator;

said mid portion of said rear stabilizer bar is substantially transverse to said at least one end portion of said rear stabilizer bar;

said means for detecting a pressure change in said first pressure medium connection comprises a pressure sensor for detecting a leak in said first pressure medium connection; and said means for detecting a pressure change in said second pressure medium connection comprises a pressure sensor for detecting a leak in said second pressure medium connection.

20. The active vehicle suspension control system of claim 11, wherein said first valve means, said second valve means, and said means for operating said front and rear actuators during failure of at least one component of the dual-circuit pressure medium actuation system comprises a three position valve.

* * * * *